United States Patent [19]
Le Garrec et al.

[11] Patent Number: 5,140,330
[45] Date of Patent: Aug. 18, 1992

[54] CONTINUOUS EMISSION RADAR DEVICE FOR DETERMINING, AT SHORT RANGE, THE RELATIVE POSITIONS OF A MISSILE AND A VEHICLE TO WHICH THE DEVICE IS FITTED

[75] Inventors: Guy Le Garrec, Sannois; Bruno R. Sebilet, Rueil Malmaison, both of France

[73] Assignee: Societe Nationale d'Etude et de Construction de Motors d'Aviation, Paris, France

[21] Appl. No.: 757,929

[22] Filed: Sep. 12, 1991

[30] Foreign Application Priority Data

Sep. 18, 1990 [FR] France ............................... 90 11481

[51] Int. Cl.⁵ .............................................. G01S 13/08
[52] U.S. Cl. ...................................... 342/146; 342/133
[58] Field of Search ...................... 342/146, 133, 118

[56] References Cited

U.S. PATENT DOCUMENTS

| | | | |
|---|---|---|---|
| 3,406,397 | 10/1968 | Easton et al. | 342/146 X |
| 3,568,198 | 3/1971 | Borowitz | 342/146 X |
| 4,305,074 | 12/1981 | Barzana et al. | 342/133 X |

FOREIGN PATENT DOCUMENTS

| | | |
|---|---|---|
| 1900854 | 8/1970 | Fed. Rep. of Germany . |
| 2286391 | 4/1976 | France . |
| 2561786 | 9/1985 | France . |

*Primary Examiner*—Mark Hellner
*Attorney, Agent, or Firm*—Oblon, Spivak, McClelland, Maier & Neustadt

[57] ABSTRACT

A continuous emission radar device for determining, at short range, the relative positions of a missile and a vehicle to which the device is fitted, includes a transmitting circuit connected to a transmitting antenna for emitting a continuous signal modulated by a pseudo-random binary sequence delivered at a clock frequency fH, and three receiving circuits connected respectively to three receiving antennae which receive echos of the emitted signal from the missile, a first receiving circuit generating the clock frequency and slaving it to the missile vehicle distance, and the other two receiving circuits determining the phase shift between the echo received by the first antenna and each of the echos received by the other two antennae, these three parameters being transmitted to a device for calculating the position of the missile in relation to the vehicle.

5 Claims, 2 Drawing Sheets

CONTINUOUS EMISSION RADAR DEVICE FOR DETERMINING, AT SHORT RANGE, THE RELATIVE POSITIONS OF A MISSILE AND A VEHICLE TO WHICH THE DEVICE IS FITTED

BACKGROUND OF THE INVENTION

1. Field of the invention

The present invention relates to a continuous emission radar device for the determination, at short range, of the relative positions of a missile and a target vehicle to which the device is fitted.

2. Summary of the prior art

The perfecting of arms systems such as missile systems requires the greatest possible knowledge of the parameters characterising the relative positions of the missile and target in the final phase of interception. To carry out these measurements, low power continuous emission radars are used to determine the minimum distance by which the missile may pass in relation to the target. This information, while it suffices for tracking, does not in itself alone allow assessment of the position of the missile in relation to the target during the final phase of interception. To obtain an adequate definition of this assessment, it is necessary to know the trajectory of the missile in relation to the target.

French Patent No. 2 561 786 in the name of the present assignee describes a device capable of calculating this trajectory. This device is based on the simultaneous employment of three receiving circuits of the type used in proximeters of the continuous emission type where the signal is modulated by a pseudo-random binary sequence. A description of such proximeters can be found in French Patent No. 2 286 391 also in the name of the present assignee.

In the known device, three distance sums are evaluated, i.e. the sum of the distances from the transmitting antenna to the missile and from the missile to the first receiving antenna, the sum of the distances from the transmitting antenna to the missile and from the missile to the second receiving antenna, and the sum of the distances from the transmitting antenna to the missile and from the missile to the third receiving antenna, and the relative positions of the missile and the target are determined from these sums.

SUMMARY OF THE INVENTION

It is an object of the present invention also to enable calculation of the trajectory of a missile by determining successive positions of the missile relative to the vehicle carrying the radar, but in a manner which achieves greater precision of measurement for an energy output which is approximately the same.

To this end, according to the invention, there is provided a continuous emission radar device for determining, at short range, the relative positions of a missile and a vehicle to which the device is fitted, said device comprising:

a transmitting antenna;
a transmitter circuit connected to said transmitting antenna for emitting a continuous signal modulated by a pseudo-random binary sequence delivered at a clock frequency fH;
a first receiving antenna for receiving a first echo of said emitted signal;
a first receiving circuit connected to said first receiving antenna and comprising first correlating means for generating a first correlation signal representing the correlation between said first echo and the same emitted signal delayed by a time delay corresponding to the journey of said emitted signal between, on the one hand, said transmitting antenna and said missile and, on the other, said missile and said first receiving antenna, and a frequency-controllable generator receiving said first correlation signal and generating a signal at said clock frequency fH, this frequency fH being representative of the distance between said missile and said vehicle;
a second receiving antenna for receiving a second echo of said emitted signal;
a second receiving circuit connected to said second receiving antenna and arranged to determine the phase shift between said first and second echos;
a third receiving antenna for receiving a third echo of said emitted signal;
a third receiving circuit connected to said third receiving antenna and arranged to determine the phase shift between said first and third echos; and
means for calculating the position of the missile relative to the vehicle from said clock frequency fH and the phase shifts determined by said second and third receiving circuits.

A single emitted signal, modulated by the pseudo-random sequence, is used for a distance measurement through knowledge of the clock frequency fH and for measurement of the angle between the missile to vehicle axis and the axis connecting the first and second receiving antennae and the angle between the missile to vehicle axis and the axis connecting the first and third receiving antennae.

Modulation by a pseudo-random sequence is equivalent to encoding, and enables the measurement of the phase shift to be shielded from surrounding interferences, which is a major advantage of the invention because it is known that measurements of phase shift are highly sensitive to interference.

In a preferred embodiment of the device, the second receiving circuit comprises second correlating means for generating a second correlation signal representing the correlation between said second echo and said time-delayed emitted signal, and means for measuring the phase shift between said first correlation signal and said second correlation signal, and the third receiving circuit comprises third correlating means for generating a third correlation signal representing the correlation between said third echo and said time-delayed emitted signal, and means for measuring the phase shift between said first correlation signal and said third correlation signal.

Each echo of the emitted signal is therefore demodulated by the respective correlating means before the phase measurement is carried out.

Advantageously, the transmitting antenna is aligned with the first and second receiving antenna along the longitudinal axis of the target vehicle, and the first and third receiving antenna are aligned on an axis not parallel to the longitudinal axis of the vehicle.

Preferably, the first and second receiving antennae, and also the first and third receiving antennae, are spaced apart from each other by a distance at the most equal to half a wavelength of the continuous signal.

This arrangement avoids uncertainty in the phase shift measurements. Indeed, when the distance between two receiving antennae is greater than half a wave length, phase measurement is carried out at approximately $2\pi$.

Other characteristics and advantages of the invention will become apparent from the following description of the preferred embodiments, which is given by way of example and with reference to the attached drawings.

DESCRIPTION OF THE PREFERRED EMBODIMENTS

Figure 1:
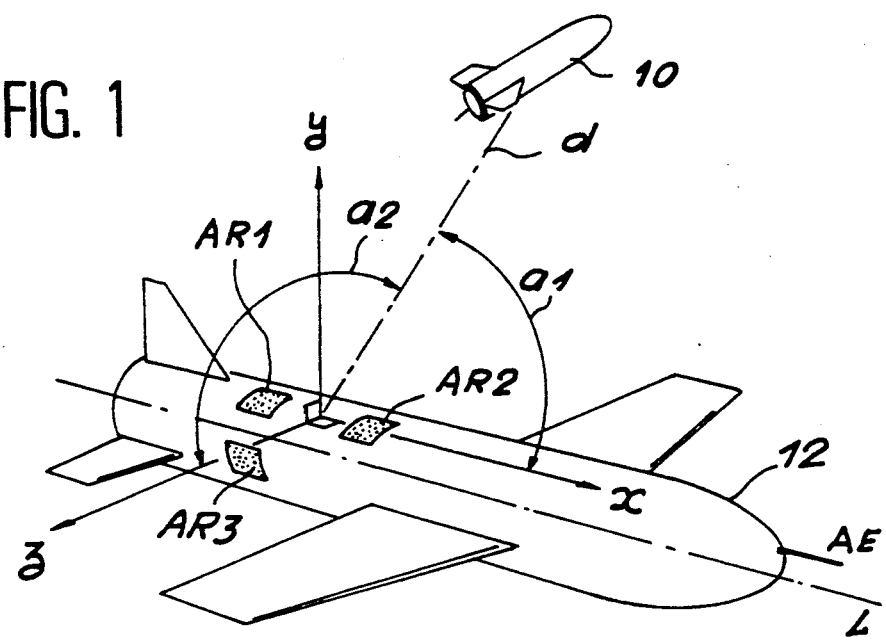
FIG. 1 represents diagrammatically the arrangement of the antennae on a vehicle fitted with one embodiment of the device in accordance with the invention.

A device in accordance with the invention determines the position of a missile in relation to a vehicle on which the device is fitted. In FIG. 1, one can see the three parameters deduced from the measurements carried out by the device and from which is calculated the position of the missile 10 in relation to a spatial reference point (x,y,z) attached to the vehicle 12 and chosen, for example, to be orthonormal. The parameters are the distance d between the missile and the vehicle, the angle a1 between the missile to vehicle axis and the axis x, and the angle a2 between the missile to vehicle axis and the axis z.

As shown in FIG. 1, the device comprises several antennae. A transmitting antenna AE permits the continuous emission of a signal modulated by a pseudo-random binary sequence, and three receiving antenna AR1, AR2, AR3, provide for the reception of an echo of the emitted signal reflected by the missile 10.

For reasons that will be given later on, the antennae AR1 and AE are aligned along the longitudinal axis L of the vehicle 12, the transmitting antenna AE being positioned at the front of the vehicle 12 and the antenna AR1 being placed at the rear.

The receiving antennae AR1 and AR2 are aligned along the reference axis x which is chosen to be parallel to the longitudinal axis L of the vehicle 12.

The receiving antennae AR1 and AR3 are aligned along the reference axis z, which is perpendicular to the axis x.

Advantageously, the receiving antennae AR1, AR2, AR3 are of the laminated type, that is to say they are printed onto an insulated substrate of a curvature corresponding to the body of the vehicle 12.

Figure 2:
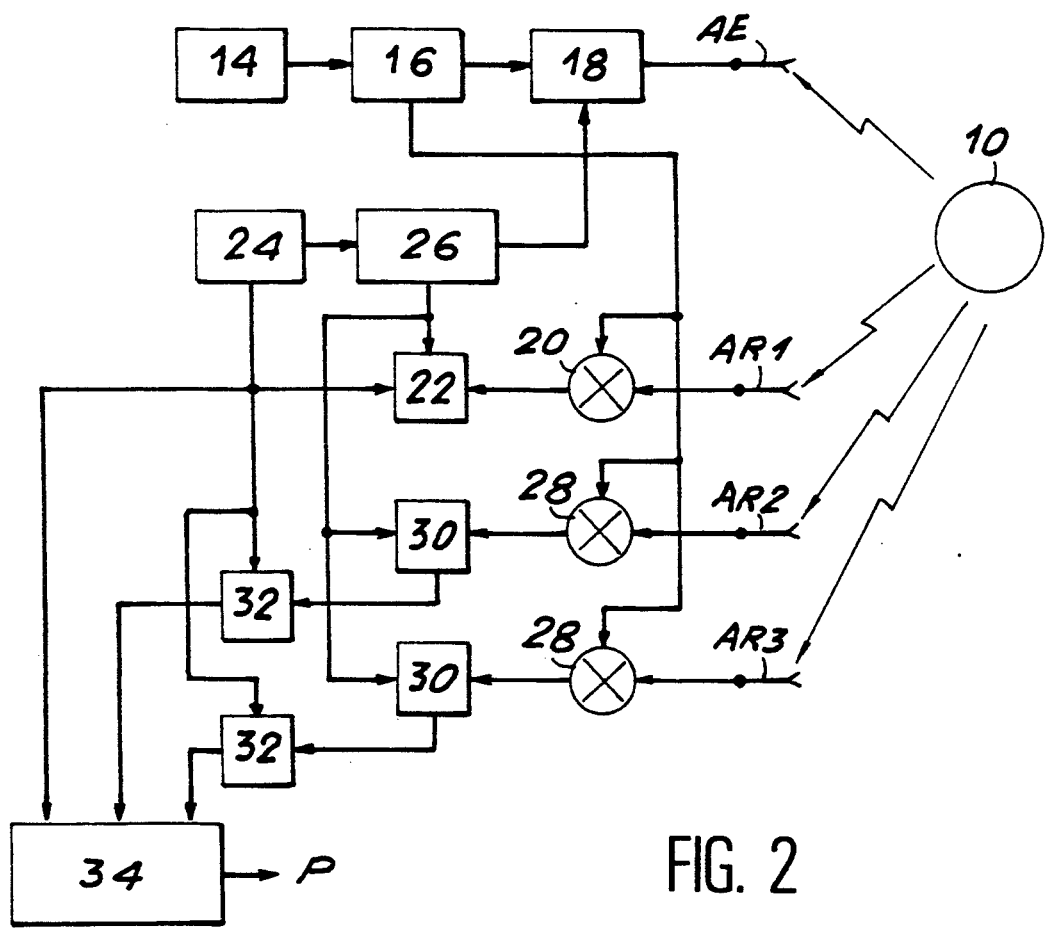
FIG. 2 is a block diagram representing one embodiment of the device in accordance with the invention.

FIG. 2 represents diagrammatically one embodiment of the device in accordance with the invention. In this embodiment the device comprises a transmitter circuit connected to the transmitting antenna AE. The transmitter circuit comprises an oscillator 14 which continuously delivers a signal having, for example, a frequency of 1.8 GHz, a coupler 16 and a biphase modulator 18. The transmitter circuit may also include other usual circuit elements, such as a transmission filter, which are not shown.

The device also comprises a first receiving circuit connected to a first receiving antenna AR1. This first receiving circuit combined with the transmitting circuit forms a proximity radar of the type described in the aforementioned French Patent No. 2 286 391. On its own, this combination only allows the establishment of a distance and not a position.

The first receiving circuit comprises a null frequency converter 20 connected to a correlator 22, a frequency controllable oscillator 24 connected to the correlator output for the generation of a signal at clock frequency, and a pseudo-random code generator 26.

The pseudo-random codes are used to control the biphase modulator 18 of the transmitter circuit.

The clock frequency of the frequency-controllable oscillator 24 is slaved to the relative distance between the missile 10 and the vehicle fitted with the device, thanks to the correlation between the pseudo-random sequence carried by the echo received by the antenna AR1 and this same sequence time-delayed.

Knowledge of the clock frequency enables one to deduce a function f(t) defined by d1+d2=f(t) where d1+d2 represents the sum of the journeys of the emitted signal between the transmitting antenna, the missile, and the receiving antenna AR1. The distance measurement is carried out with a positional ambiguity corresponding, at any given moment, to an elliptical surface of which the two antennae AE and AR1 are the focal points.

The device further comprises second and third receiving circuits which are respectively connected to the receiving antennae AR2 and AR3. These receiving circuits are identical and each comprises a null frequency converter 28 connected, on the one hand, to the corresponding receiving antenna and, on the other, to the coupler 16 of the transmitter circuit, and a correlator 30 for correlating the pseudo-random sequence coming from the converter 28 with this same sequence coming from the generator 26, but time-delayed. The correlator 30 delivers a correlation signal at an output connected to an input of means 32 for measuring the phase shift between the correlation signal issuing from the respective receiving circuit and the correlation signal emanating from the first receiving circuit.

The three receiving circuits may also includes other usual circuit elements (not represented), such as a receiving filter for example.

The signal carrying the clock frequency and coming from the correlator 22 of the first receiving circuit, and the signals corresponding to the phase shifts measured by the means 32 of the second and third receiving circuits are transmitted to the input of means 34 for calculating the position P of the missile relative to the vehicle.

For reasons of space, the calculating means 34 is not carried by the target vehicle but remains on the ground, being in communication with the target vehicle through RF transmission or other means.

The calculating means 34 comprise at least one frequency meter and a computer. The clock frequency corresponds to the missile-target vehicle distance which defines in space an ellipsoid with the antennae AR1 and AE as its focal points.

The measurement of the phase shift between the signals detected by the antennae AR1 and AR2 defines in space a hyperboloid having these antennae as its focal points.

The intersection of these two geometric functions defines a circle in space, since the antennae AR1, AR2 and AE are aligned along the same axis, this being the greater axis of the ellipsoid.

The measurement of the phase shift between the signals detected by the antennae AR1 and AR3 defines in space another hyperboloid having these antennae as its focal points.

The intersection of the second hyperboloid and the circle resolves itself at two points which correspond to two possible positions of the missile, and this ambiguity is removed by limiting the coverage of the antennae AR2 and AR3 to only one hemisphere in space.

To avoid any ambiguity in the measurement of the angles a1 and a2, in particular a modulo measurement $2\pi$, the antennae AR1 and AR2, on the one hand, and AR1 and AR3 on the other, are spaced apart by a maximum of a half wavelength, in free space, of the continuous signal. In the example described, where the frequency is equal to 1.8 GHz, this spacing is chosen to be 8 cm.

One therefore obtains a point perfectly located in a hemispherical space by its distance and the angles a1 and a2 previously defined (FIG. 1). From these parameters, one can easily deduce the abscissa, the ordinate and the side of the reference point (x,y,z).

To obtain complete coverage in space, it suffices to duplicate the device.

Figure 3:
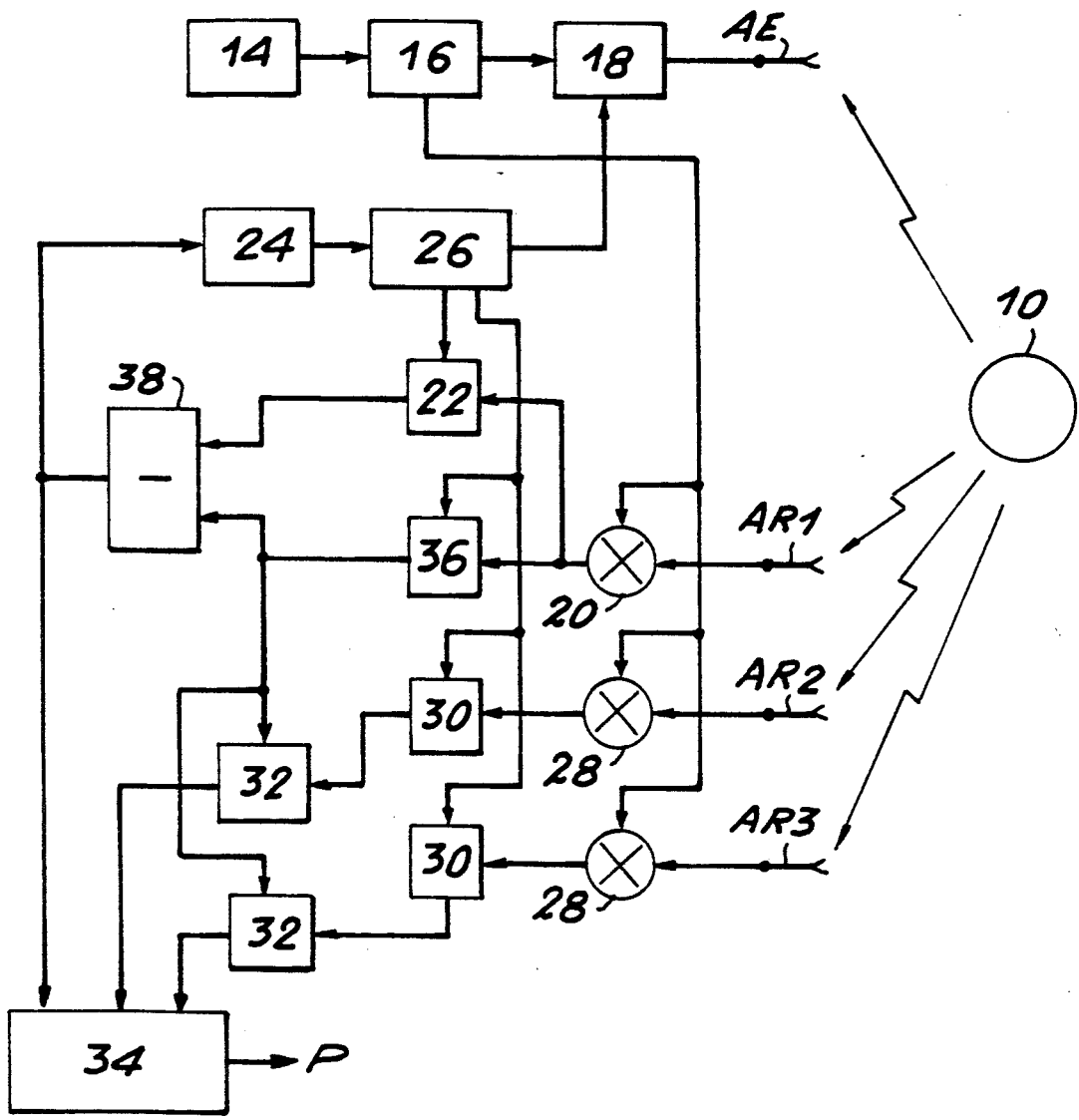
FIG. 3 is a block diagram representing an alternative embodiment of the device in accordance with the invention.

FIG. 3 represents diagrammatically a modification of the embodiment just described. In this variant, a differential measurement is made in the first receiving circuit between the correlation signal generated by the correlator 22 and that generated by another correlator 36. This latter correlator 36 carries out a correlation between the pseudo-random sequence of the echo of the emitted signal received by the antenna AR1 and this same sequence received from the generator 26 but with a known time delay different from that introduced for the correlation by the correlator 22. The subtraction is carried out by a subtractor 38 which delivers a differential signal to control the frequency-controlled oscillator 24.

This variant enables the frequency to be slaved in relation to a null signal rather than to a maximum of the correlation signal and gives more precise results.

The determination of successive relative positions of the missile and the target vehicle enables a trajectory to be established that characterises the path of the missile at a short distance from the target vehicle.

We claim:

1. A continuous emission radar device for determining, at short range, relative positions of a missile and a vehicle to which the device is fitted, said device comprising:
    a transmitting antenna;
    a transmitter circuit connected to said transmitting antenna for emitting a continuous signal modulated by a pseudo-random binary sequence delivered at a clock frequency fH;
    a first receiving antenna for receiving a first echo of said emitted signal;
    a first receiving circuit connected to said first receiving antenna and comprising:
        first correlating means for generating a first correlation signal representing a correlation between said first echo and the emitted signal delayed by a time delay corresponding to a journey of said emitted signal between said transmitting antenna and said missile and between said missile and said first receiving antenna, and
        a frequency-controllable generator receiving said first correlation signal and generating a signal at said clock frequency fH, this frequency fH being representative of a distance between said missile and said vehicle;
    a second receiving antenna for receiving a second echo of said emitted signal;
    a second receiving circuit connected to said second receiving antenna and arranged to determine a phase shift between said first and second echos;
    a third receiving antenna for receiving a third echo of said emitted signal;
    a third receiving circuit connected to said third receiving antenna and arranged to determine a phase shift between said first and third echos; and
    means for calculating a position of the missile relative to the vehicle from said clock frequency fH and the phase shifts determined by said second and third receiving circuits.

2. A device in accordance with claim 1, wherein said second receiving circuit comprises:
    second correlating means for generating a second correlation signal representing a correlation between said second echo and said time-delayed emitted signal; and
    means for measuring a phase shift between said first correlation signal and said second correlation signal;
    and said third receiving circuit comprises:
    third correlating means for generating a third correlation signal representing a correlation between said third echo and said time-delayed emitted signal; and
    means for measuring a phase shift between said first correlation signal and said third correlation signal.

3. A device in accordance with claim 1, wherein said transmitting antenna is aligned with said first and second receiving antennae along a longitudinal axis of said vehicle, and said first and third receiving antennae are aligned along an axis not parallel to said longitudinal axis of said vehicle.

4. A device in accordance with claim 1, wherein said first and second receiving antennae, and also said first and third receiving antennae, are spaced apart from each other by a distance no more than a half wavelength of said continuous signal.

5. A device in accordance with claim 3, comprising said third receiving antenna being aligned along an axis perpendicular to said longitudinal axis.

* * * * *

UNITED STATES PATENT AND TRADEMARK OFFICE
CERTIFICATE OF CORRECTION

PATENT NO. : 5,140,330
DATED : August 18, 1992
INVENTOR(S) : GUY LE GARREC ET AL It is certified that error appears in the above-indentified patent and that said Letters Patent is hereby corrected as shown below:

```
Column 1, line 11, delete "target".
Column 2, line 59, delete "target".
Column 4, line 40, delete "includes" and insert
--include--;
          line 51, delete "target";
          line 52, delete "target";
          line 56, delete "missile-target vehicle" and
insert --missile-vehicle--.
Column 5, line 41, delete "target";
Column 5, line 43, delete "target".
```

Signed and Sealed this

Twelfth Day of October, 1993

*Attest:*

BRUCE LEHMAN

*Attesting Officer*       *Commissioner of Patents and Trademarks*